United States Patent [19]

Cowles

[11] Patent Number: 4,725,640

[45] Date of Patent: * Feb. 16, 1988

[54] METAL FIXATIVE IN AUTOMOTIVE PAINT

[75] Inventor: Richard A. Cowles, Perrysburg, Ohio

[73] Assignee: BASF Corporation, Clifton, N.J.

[*] Notice: The portion of the term of this patent subsequent to Sep. 3, 2002 has been disclaimed.

[21] Appl. No.: 868,370

[22] Filed: May 27, 1986

Related U.S. Application Data

[60] Continuation of Ser. No. 723,692, Apr. 16, 1985, abandoned, which is a division of Ser. No. 489,056, Apr. 28, 1983, Pat. No. 4,539,460.

[51] Int. Cl.⁴ ............................ C08K 5/02; C08K 3/08
[52] U.S. Cl. ................................ 524/439; 524/440; 524/441; 524/472; 524/513
[58] Field of Search ............... 524/439, 440, 441, 472, 524/513; 525/167.5

[56] References Cited

U.S. PATENT DOCUMENTS 2,980,638  4/1961  Polovina ........................... 524/441
4,539,360  9/1985  Cowles ............................. 524/441

FOREIGN PATENT DOCUMENTS 2352774  4/1975  Fed. Rep. of Germany ...... 524/472

52-69439  6/1977  Japan .................................. 524/513

Primary Examiner—Lewis T. Jacobs
Attorney, Agent, or Firm—Emil Richard Skula

[57] ABSTRACT

An improved coating composition containing chlorinated polyolefin to provide superior orientation of metallic pigment flakes in the coating. The invention is particularly useful in the pigmented base coat of a base coat-clear coat coating since it permits the use of a thinner base coat which, because of the improved orientation of the metallic pigment flakes, provides superior hiding or masking of the coated substrate.

The coating composition comprises a solvent, a film forming resin selected from the group consisting of acrylic, alkyd, polyester and polyurethane resins, a uniformly dispersed pigment and a chlorinated polyolefin. The multilayer coating composition comprises a base coat comprising a film forming resin selected from the group consisting of acrylic, alkyd, polyester and polyurethane in a solvent, a uniformly dispersed pigment and a chlorinated polyolefin, and a topcoat comprising a transparent coating composition deposited on said basecoat, said topcoat comprising a second film-forming resin selected from the group consisting of acrylic, alkyd polyester and polyurethane resin dispersed in a volatile organic solvent.

1 Claim, No Drawings

METAL FIXATIVE IN AUTOMOTIVE PAINT

This is a continuation of U.S. patent application Ser. No. 723,692 filed on Apr. 16, 1985, now abandoned, which is in turn a Divisional Application of U.S. patent application Ser. No. 489,656 filed on Apr. 28, 1983, issued as U.S. Pat. No. 4,539,460.

BACKGROUND OF THE INVENTION

The present invention is directed to coating compositions for use as decorative finish or top coats for automobile vehicle bodies.

In the automotive industry two significant systems are utilized in the painting of automobiles. One topcoat system which utilizes thermoplastic resins is known as the acrylic lacquer system. The other topcoat system used in the automotive industry is the thermosetting acrylic resin as described in U.S. Pat. No. 3,375,227, issued May 26, 1968.

Because of environmental considerations, organic solvent reducible acrylic enamels of the foregoing type have been superseded in certain situations by water reducible acrylic enamels.

Multilayer coating systems are also well known in the coating industry. These coating systems which comprise a thin aluminum flake pigmented base coat and a clear top coat are increasingly popular in the automotive industry. The majority of cars manufactured in Europe and Japan are painted with base coat-clear coat systems. The advantages of the base coat-clear coat multilayer coating system are numerous including outstanding appearance, superior gloss, improved chemical and mar resistance, and extended duty. In order to prepare these systems it has been required that each coat be baked or cured before a second or topcoat is applied. Thus several time consuming baking or curing steps are normally required where multilayer systems are applied. In U.S. Pat. No. 3,639,147 a multilayer coating system is described that eliminates the need to bake or cure the base layer before the second or topcoat is applied. This multilayer coating system has been adapted by the original equipment paint industry.

Repairing the base coat-clear coat finishes in the field has represented a problem. As previously mentioned, the multilayer coatings used by the OEM manufacturers must be baked in order to be useful. Repair shops require a base coat-clear coat refinish coating system which is capable of being dried in ambient room air. In addition, this refinish coating must match the characteristics of the OEM coating.

This invention relates to the use of chlorinated polyolefins in a coating containing a metallic flake pigment thereby preventing metal flake disorientation. This invention further relates to a base coat-clear coat which can be applied in the field and dried under ambient room air conditions resulting in an applied coating which matches the OEM coating, wherein the basecoat contains chlorinated polyolefins. This invention is also applicable to base coat-clear coat OEM baked coatings.

An advantage of this invention is that it permits the use of increased pigment concentrations in the base coat or top coat resulting in a thinner applied coating.

The prior art contains several examples of polymeric coating compositions useful for refinishing or repairing damaged coatings in the field. An acrylic coating composition for refinishing flexible automobile and truck bumpers is shown in Sheppard U.S. Pat. No. 3,829,397 issued on Aug. 13, 1974 and U.S. Pat. No. 3,893,960 issued on July 8, 1975.

A water-based alkyd resin coating composition is shown in Miller U.S. Pat. No. 4,321,169 issued on Mar. 23, 1982. The coating composition disclosed in Miller can be dried at ambient temperatures and is useful for coating metal and plastic substrates and in particular for finishing or repairing automobiles and trucks.

An acrylic coating composition for repairing acrylic lacquer coatings which are used in the auto industry is disclosed in Willey U.S. Pat. No. 3,711,411 issued on Jan. 16, 1973.

The disclosures of U.S. Pat. Nos. 3,829,397; 3,893,960; 4,321,169 and 3,711,411 are incorporated by reference.

Aesthetically, the acceptable appearance of a metallic pigmented coating is dependent upon the correct orientation of the metal particles. The acceptable appearance of a metalized coating is defined as that appearance which usually matches the appearances of a reference standard, or, if no such standard exists, the coating should exhibit a surface free from mottling, ghosting, general discontinuities, or any visual apparation signifying disorientation of the included metal.

The formulation of metallic coatings generally is limited to small amounts of included metallic pigment. Usually, metallic pigments in excess of 3% of the coating composition will lead to metal disorientation characterized by application problems resulting in the loss of an acceptable appearance.

In order to completely hide or cover the surface to be coated, repeated applications of the coating are required, often resulting in an excessively thick film. Excessively thick films are characterized by film embrittlement and general loss of adhesion and flexibility. Film thickness exceeding 2-2.5 mils are considered undesirable. A mil is defined as 0.001 inches.

Excessive film thickness is particularly prevalent when the metallic color coat is overlaid with a clear transparent coating designed to enhance gloss, durability and general aesthetics.

When applying a clear overlay over a metallized basecoat, the desired film thickness can be achieved by applying a very thin layer of the basecoat, followed by a normal thickness application of the clear coat. In order to achieve complete hiding by the basecoat, more metallic pigment must be included in its composition without detriment to its appearance. Increased amounts of metallic pigment can be incorporated into the coating by introducing adjunct binder materials. These adjunct materials are characterized by a general lack of color, and an ability to protect the metal particles from disorientation during application. Such adjunct binders are currently employed by the industry. An example is a copolymer of polyethylene and vinyl acetate manufactured by Allied Chemical Corporation and designated as AC405. Other examples are a number of commercially available non aqueous acrylic resin dispersions as in U.S. Pat. No. 4,220,679.

Ideally, an adjunct binder suitable for protecting metal flakes from disorientation during application: (1) should be uneffected by the presence of companion binders, (2) should not be influenced by the solvent combination employed in the coating formulation; (3) should not detract from the achievement of a desired color; and, (4) should be easily incorporated into any coating composition containing metal flakes using standard mixing procedures. Chlorinated polyolefins meet the previously stated requirements.

The problems and disadvantages associated with prior art base coat-clear coat refinish paint systems are overcome in accordance with the present invention wherein the addition of a chlorinated polyolefin resin to the base coat results in the metal fixation needed for proper color match and appearance.

SUMMARY OF THE INVENTION

The benefits and advantages of the present invention are achieved by incorporating a chlorinated polyolefin into a base coat formulation.

Among the base coats which are useful according to the processes of this invention are those commonly known as alkyd resins which are defined to include fatty acid or oil containing esterification products. The methods for preparing these resins are well known in the art. In general two basic methods are used. In the first a fatty acid is reacted with a mixture of polyols and polybasic acids such as glycerine and phthalic anhydride. The second method commonly used entails the alcoholysis of a fatty oil such as cocoanut oil with a polyol such as pentaerythritol and then the further condensation of this reaction product with polyols and polybasic acids as above.

The preferred alkyd resins useful in this invention are those containing from about 5 to about 65 weight percent of a fatty acid or oil and having an hydroxyl equivalent to carboxy equivalent ratio of from about 1.05 to 1.75. Alkyd resins having less than about 5 percent fatty compound are classified as the "oil-less" alkyd resins or polyester resins described hereinafter. On the other hand, alkyd resins containing greater than 65 percent of a fatty compound exhibit poor baking properties, poor chemical resistance and unsatisfactory adhesion to either the base coat or the substrate. When the hydroxyl to carboxyl equivalent ratio is less than about 1.05 gelation can result during polymer preparation while resins prepared having a ratio in excess of 1.75 have low molecular weights and therefore poor chemical resistance.

These alkyd resins can also be used as the topcoat of this invention. When this is the case it is preferred that the oil or fatty acid portion of the alkyd resin contain a light colored baking oil or fatty acid such as cocoanut or dehydrated castor oils or fatty acids. Furthermore, when these resins are used as topcoats they can be reacted with various acrylic or ethylenically unsaturated monomers as described above to produce vinyl modified alkyd resins.

Curing of these alkyd resins can be accomplished by blending with any of the widely known cross-linking agents in the same weight ratios as are used with carboxy-hydroxy copolymers.

Included among the various fatty acids and oils useful in preparing these alkyd resins are the fatty acids derived from the following oils: castor, dehydrated castor, cocoanut, corn, cottonseed, linseed, oticica, perilla, poppyseed, safflower, soybean, tung oil, etc., and the various rosins containing tall oil fatty acids. Useful polyols include the various glycols, such as ethylene glycol, propylene glycol, neopentyl glycol, butylene glycol, 1,4 butanediol, hexylene glycol, 1,6 hexanediol, the polyglycols such as diethylene glycol or triethylene glycol, etc., the triols such as glycerine, trimethylol ethane, trimethylol propane, etc., and other higher functional alcohols such as pentaerythritol, sorbitol, mannitol, and the like. Acids useful in preparing the alkyd resins of this invention include monofunctional acids such as rosin acids, benzoic acid, para tertiary butyl benzoic acid and the like; the polyfunctional acids such as adipic acid, sebacic acid, phthalic acid or anhydride, isophthalic acid, terephthalic acid, dimerized and polymerized fatty acids, trimellitic acid, and the like.

In another instance the base coat film is produced from resins known as polyesters or "oil-less" alkyd resins. These resins are prepared by condensing non-fatty containing polyols and polyacids. Included among the useful polyacids are isophthalic acid, phthalic acid or anhydride, terephthalic acid, maleic acid or anhydride, fumaric acid, oxalic acid, sebacic acid, azelaic acid, adipic acid, etc. Monobasic acids such as benzoic, para tertiary butyl benzoic and the like can also be utilized. Among the poly alcohols are the diols or glycols such as propylene glycol, ethylene glycol, butylene glycol, 1-4-butanediol, neopentyl glycol, hexylene glycol, 1,6-hexanediol, and the like; the triols such as trimethylol ethane, trimethylol propane and glycerine and various other higher functional alcohols such as pentaerythritol.

The preferred type of polyester resin comprises the reaction product of aromatic and aliphatic mono and dibasic acids with a mixture of diols and higher functional alcohols. In order to obtain the optimum cure properties and molecular weight it is desirable for the ratio of the equivalents of hydroxyl in the alcohol reactants to the equivalents of acid in the acid reactants to be from about 1.1:1 to 1.75:1. Polyester resins having hydroxy to carboxyl equivalents ratios of less than about 1.1 generally gel before preparation is complete while those having ratios in excess of 1.75 are too low in molecular weight to have acceptable chemical resistance properties.

Utilizing the process of this invention offers a means of combining the desirable properties of a combination of resin systems. For example, in automotive finishes the pigment control properties of acrylic lacquers can be combined with the chemical resistance properties of thermosetting acrylic resins by applying a thermosetting acrylic clear coat over a thermoplastic acrylic lacquer base coat. Likewise in appliance finishes the chemical resistance of polyester resins can be combined with the lower cost of thermosetting acrylic resins by applying a polyester clear topcoat over a pigmented thermosetting acrylic base coat.

Especially preferred is a 1:1 blend of two resins. The first is a fatty acid oil modified acrylic polymer and the second is a 40% acrylated alkyd resin cured with moderate levels of cobalt and zinc dryers. In addition, various urethane polymers can also be used in forming the base coat or especially the transparent topcoat of this invention. These polymers can be prepared by several well-known methods.

A distinct advantage of this invention when incorporating a chlorinated polyolefin is the control of pigment dispersion and orientation in the film when sprayed. Pigment control is evidenced by the "standard metallic appearance" which is the striking appearance of depth when the angle of incidence varies over curved surfaces. In this invention the pigments which are in the base coat and particularly metallic flakes, such as aluminum flakes, remain properly orientated and dispersed in the film as the film is applied, when the base film is overcoated with the transparent topcoat. The chlorinated polyolefin is preferably incorporated into the base coat by inclusion into the formulation of resin, pigment and solvent, if any, before coating. In some instances additional improvements in this orientation and dispersion are obtained during a baking operation, i.e., the appearance of depth in the baked film is better than that in the wet film. As stated above, pigment control is retained in the base coat while it is being overcoated. This is evidenced by lack of "strike-in" or migration of the two films (the base coat and topcoat) into each other. When "strike-in" occurs, pigments move from the base coat into the topcoat, the film compositions become intermixed at the interface and the baked coating composition has a dusty appearance rather than a clear "depth" appearance. Sufficient wetting takes place at the interface so that no problems of delamination and solvent release from either coating are obtained.

DESCRIPTION OF THE PREFERRED EMBODIMENTS

The coating composition useful in the base coat of the present invention comprises a substantially uniform mixture or dispersion of a vehicle comprising a resin binder and a solvent comprising a volatile organic solvent in further combination with a chlorinated polyoefin and a suitable pigment.

Typical of the useful resin binders are acrylic alkyd and polyester resins. Useful chlorinated polyolefins include those commercially available from Hercules, Inc., Eastman Chemical Products, Inc., Chugai International Corporation and Sorbin Chemicals, Inc.

A preferred embodiment of the invention contains the following ingredients: 3–10% pigment, .05–0.2% suspension aid, 5–25% chlorinated polyolefin solution, 20–50% film-forming resin, and 40–75% volatile organic resin solvent. This composition, when sprayed on a suitable substrate, both with and without a clear coat overlay, exhibits a superior surface free from mottling, ghosting, general discontinuities or any apparition signifying disorientation of the pigment.

A clear coat contains 30–60% film-forming resin and 40–70% volatile organic solvent.

In order to further illustrate the coating compositions of the present invention, the following examples are provided. It will be understood that the examples are provided for illustrative purposes and are not to be restrictive of the scope of the invention as herein described and as set forth in the claims.

EXAMPLES 1–2

These examples illustrate the effects of adding a chlorinated polyolefin as a fixative for metallic flakes to an acrylic coating composition. In these examples, a control composition comprising an aluminum pigmented thermoplastic acrylic coating composition (Example 1) and a test composition (Example 2) having substantially the same composition except that it contained approximately 5% by weight chlorinated polyolefin solution, were prepared using standard thermoplastic acrylic coating composition mixing procedures. The compositions had the following formulations:

| Ingredients | Weight % | |
|---|---|---|
| | Ex. No. 1 | Ex. No. 2 |
| Medium Aluminum Pigment (1) | 3.1 | 3.2 |
| Toluene | 3.1 | 3.2 |
| Suspension Aid (2) | 0.1 | 0.1 |
| Chlorinated Polyolefin (3) | — | 5.0 |
| Thermoplastic Acrylic Vehicle (4) | 36.5 | 34.0 |
| Acrylic Lacquer Thinner (5) | 57.2 | 54.5 |

(1) a pigment paste consisting of 60% aluminum flake and 40% aliphatic naphtha.
(2) Anti-Terra U brand suspending aid manufactured by K. Mallinckrodt.
(3) Eastman Chlorinated Polyolefin 343-1 comprising a solution of 50% solids in xylene.
(4) A 34.2% solids solution of a blend of an acrylic resin comprising methyl methacrylate and isobutyl methacrylate, cellulose acetate butyrate and phthalate plasticizer in a solvent consisting of 2.91% isopropyl alcohol, 3.24% cellosolve acetate, 10.37% methyl ethyl ketone, 0.4% methyl isobutyl ketone, 0.4% aliphatic naphtha, 37.77% toluene, 1.40% xylene and 8.4% Solvesso (an aromatic naphtha).
(5) A blend consisting of 25% acetone, 20% V.M & P naphtha, 20% ethylene glycol ethylether acetate, 15% isopropyl alcohol, 10% toluene and 5% xylene.

The above compositions were sprayed onto 12"×6" substrates both with and without clear coat overlays. The film thickness was less than 2.5 mils. The coating was allowed to dry in ambient room air.

Example 1, the control composition, exhibited a disturbance of the metallized surface resulting from disorientation of the metal flakes. Example 2, the composition containing the chlorinated polyolefin, exhibited a surface free from mottling, ghosting, general discontinuities, or any visual apparition signifying disorientation of the included metal flakes.

EXAMPLES 3–4

These examples illustrate the effects of adding a chlorinated polyolefin as a fixative for metallic flakes to an acrylic enamel coating composition. In these examples, a control composition comprising an aluminum pigmented acrylated enamel coating composition (Example 3) and a test composition (Example 4) having substantially the same composition except that it contained approximately 5% by weight chlorinated polyolefin solution, were prepared using standard acrylated enamel coating composition mixing procedures. The compositions had the following formulations:

| Ingredients | Weight % | |
|---|---|---|
| | Ex. No. 3 | Ex. No. 4 |
| Medium Aluminum Pigment of Examples 1 and 2 | 3.1 | 3.2 |
| Toluene | 3.1 | 3.2 |
| Suspension Aid of Examples 1 and 2 | 0.1 | 0.1 |
| Chlorinated Polyolefin of Examples 1 and 2 | — | 5.0 |
| Acrylated Enamel Vehicle (1) | 33.8 | 31.6 |
| Acrylic Lacquer Thinner of Examples 1 and 2 | 59.9 | 56.9 |

(1) A blend of (I) an acrylated alkyd resin derived from vegetable oil fatty acids, an aliphatic polyol, mono & dibasic aromatic acids modified with esters of acrylic and methacrylic acids and an aromatic substituted vinyl monomer, and (II) a vegetable oil fatty acid modified polymer of esters of acrylic and methacrylic acids and an aromatic substituted vinyl monomer.

The above compositions were sprayed onto 12"×16" substrates both with and without clear coat overlays; the film thickness was less than 2.5 mils. The coating was allowed to dry in ambient room air.

Example 3, the control composition, exhibited a gross disturbance of the metallized coating resulting from disorientation of the metal flakes. Example 4, the composition containing the chlorinated polyolefin, exhibited a surface free from mottling, ghosting, general discontinuities, or any visual apparition signifying disorientation of the included metal flakes.

EXAMPLES 5-6

These examples illustrate the effects of adding a chlorinated polyolefin as a fixative for metal flakes to an alkyd enamel coating composition. In these examples, a control composition comprising an aluminum pigmented alkyd enamel coating composition (Example 5) and a test composition (Example 6) having substantially the same composition except that it contained approximately 5% by weight chlorinated polyolefin solution, were prepared using standard thermoplastic acrylic coating composition mixing procedures. The compositions had the following formulations:

| Ingredients | Weight % | |
|---|---|---|
| | Ex. No. 5 | Ex. No. 6 |
| Medium Aluminum Pigment of Examples 1, 2, 3 & 4 | 3.1 | 3.2 |
| Toluene | 3.1 | 3.2 |
| Suspension Aid of Examples 1, 2, 3 & 4 | 0.1 | 0.1 |
| Chlorinated Polyolefin of Examples 1, 2, 3 & 4 | — | 5.0 |
| Alkyd Vehicle (1) | 30.8 | 28.8 |
| Alkyd Enamel Thinner (2) | 62.9 | 59.7 |

(1) A 40% solids solution of an alkyd resin derived from vegetable oil fatty acids, an aliphatic polyol and mono and dibasic aromatic acids in a solvent consisting of 25% aliphatic naphtha, 20% V.M & P naphtha and 15% xylene.
(2) A blend consisting of 53% V.M & P naphtha, 21% lactol spirits, 11% ethylene glycol ethyl ether acetate, 5% ethyl acetate, 5% Solvesso 150 (aromatic hydrocarbon) and 5% toluene.

The above compositions were sprayed onto 12"×16" substrates both with and without clear coat overlays. The film thickness was less than 2.5 mils. The coating was allowed to dry in ambient room air.

Example 5, the control composition, exhibited disturbance of the metallized coating resulting from disorientation of metal flakes. Example 6, the composition containing the chlorinated polyolefin, exhibited a surface free from mottling, ghosting, general discontinuities or any visual apparition signifying disorientation of the included metal flakes.

EXAMPLE 7

A coating composition is made comprising:
6% uniformly dispersed pigment of Examples 1-6
6% toluene
0.1% suspending aid of Examples 1-6
10% chlorinated polyolefin solution of Examples 1-6
28.1% thermoplastic acrylic vehicle of Examples 1 and 2
50% acrylic lacquer thinner of Examples 1 and 2.

The above composition is sprayed onto a suitable substrate both with and without a clear overlay. The composition exhibited a surface free from mottling, ghosting, general discontinuities or any apparition signifying disorientation of the included metal flakes.

EXAMPLE 8

A coating composition is made comprising:
10% uniformly dispersed pigment of Examples 1-7
10% toluene
0.2% suspending aid of Examples 1-7
20% chlorinated polyolefin solution of Examples 1-7
20.8% acrylated enamel vehicle of Examples 3-4
39% acrylic lacquer thinner of Examples 3-4.

The above composition is sprayed onto a suitable substrate both with and without a clear overlay. The composition exhibited a surface free from mottling, ghosting, general discontinuities or any apparition signifying disorientation of the included metal flakes.

EXAMPLE 9

A coating composition is made comprising:
3% uniformly dispersed pigment of Examples 1-8
3% toluene
0.05% suspending aid of Examples 1-8
4% chlorinated polyolefin dispersion of Examples 1-8
42% alkyd vehicle of Examples 5-6
47.5% alkyd enamel thinner of Examples 5-6.

The above composition is sprayed onto a suitable substrate both with and without a clear overlay. The composition exhibited a surface free from mottling, ghosting, general discontinuities or any apparition signifying disorientation of the included metal flakes.

I claim:

1. A method of orienting metallic flakes in a coating composition, wherein the coating composition is applied to a substrate and cured, the coating composition comprises a solvent, a film forming resin selected from the group consisting of acrylic, polyester and polyurethane resins, and a uniformly dispersed metal flake pigment, wherein said method comprises including sufficient quanitities of a chlorinated polyolefin in the coating composition so that the metallic pigment flakes are oriented substantially parallel to the substrate upon application, thereby producing a coating composition free from mottling, ghosting, general discontinuities or any unusual apparition signifying disorientation of the included metal.

* * * * *